April 19, 1960
R. R. L. GEFFROY
2,933,075
APPARATUS FOR CONTROLLING THE FLOW OF
AIR TO THE INTAKE MANIFOLD AND THE
IGNITION OF AN AUTOMOTIVE ENGINE
Filed March 12, 1956
5 Sheets-Sheet 1
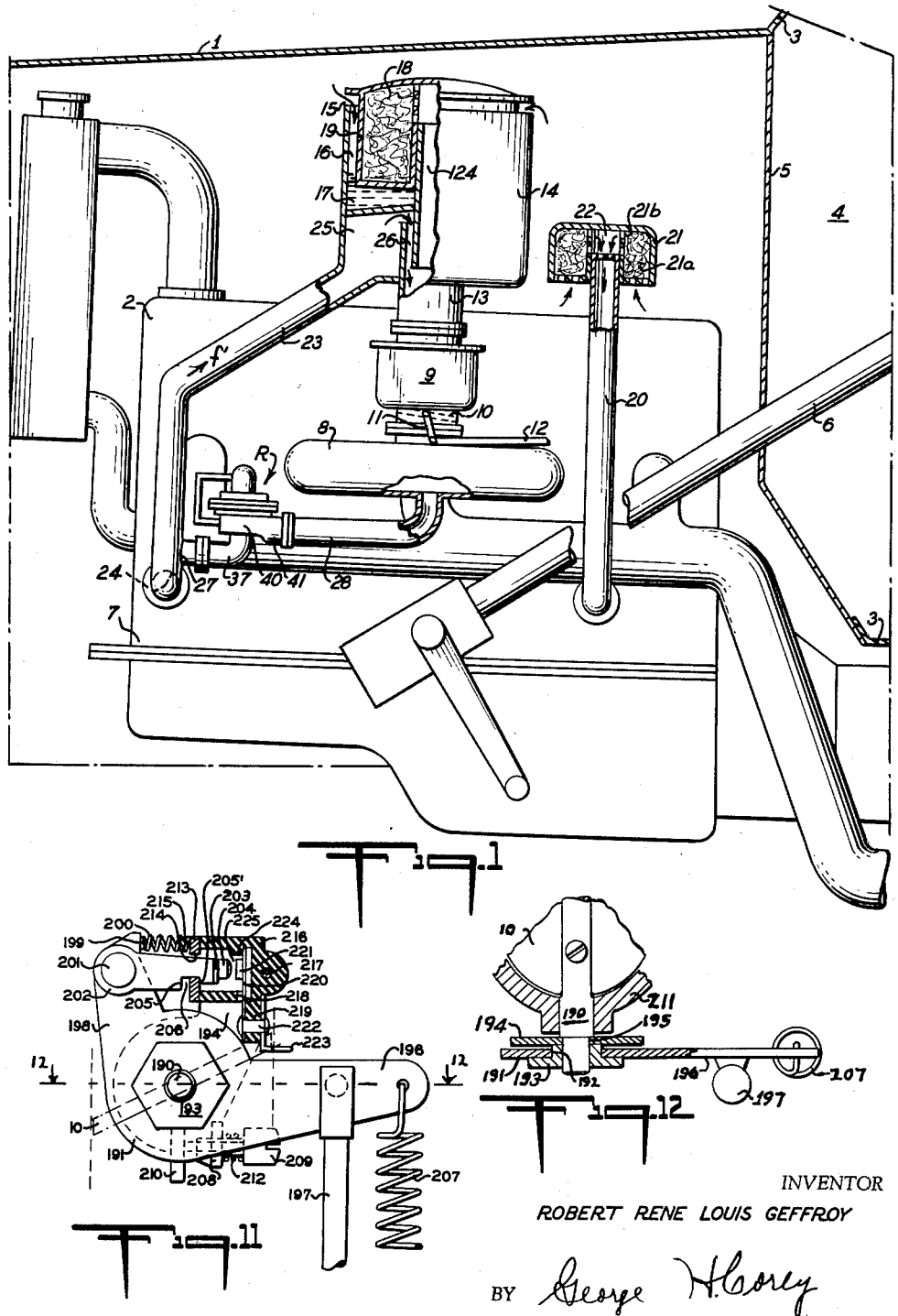
INVENTOR
ROBERT RENE LOUIS GEFFROY
BY George H. Corey
ATTORNEY

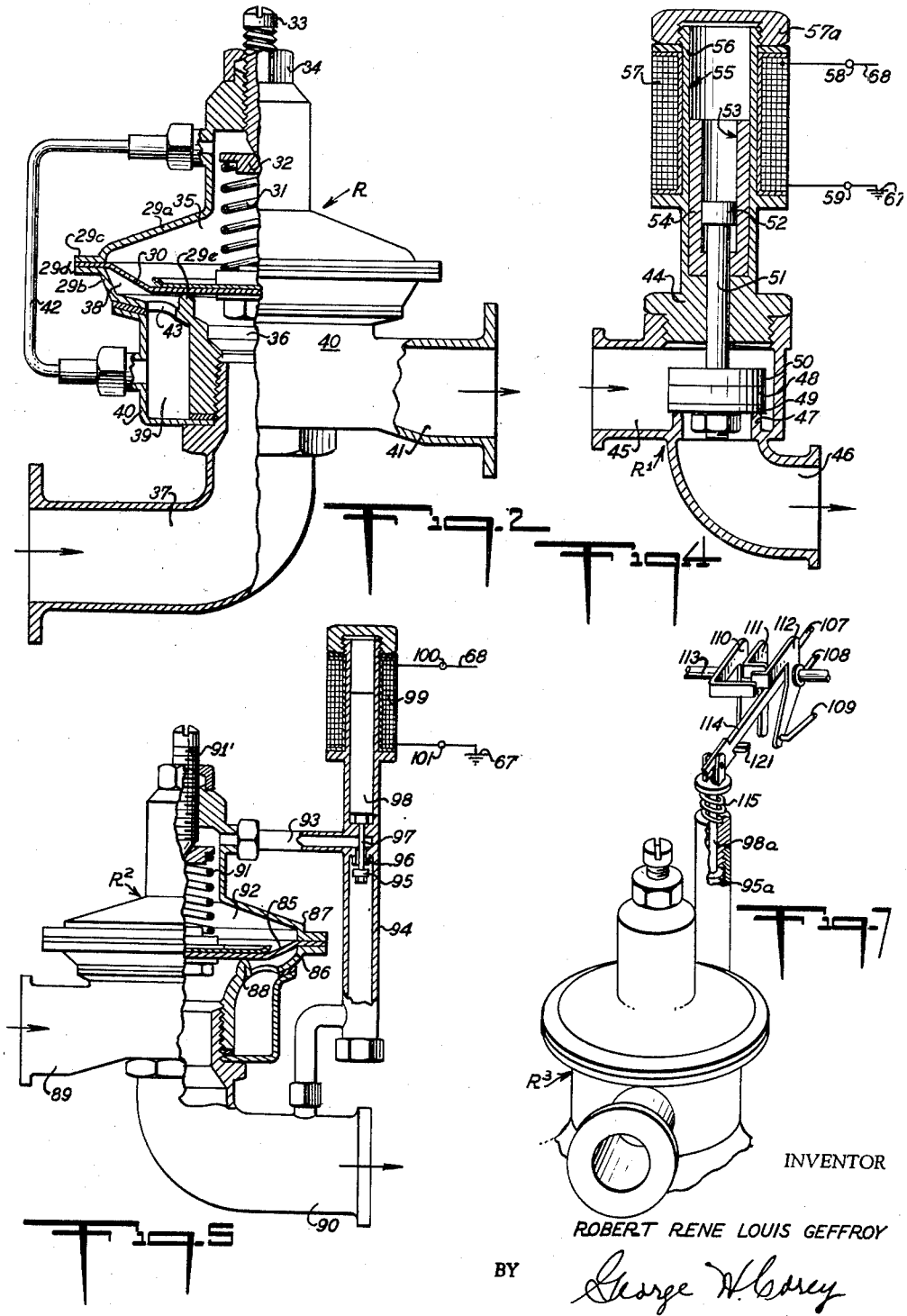

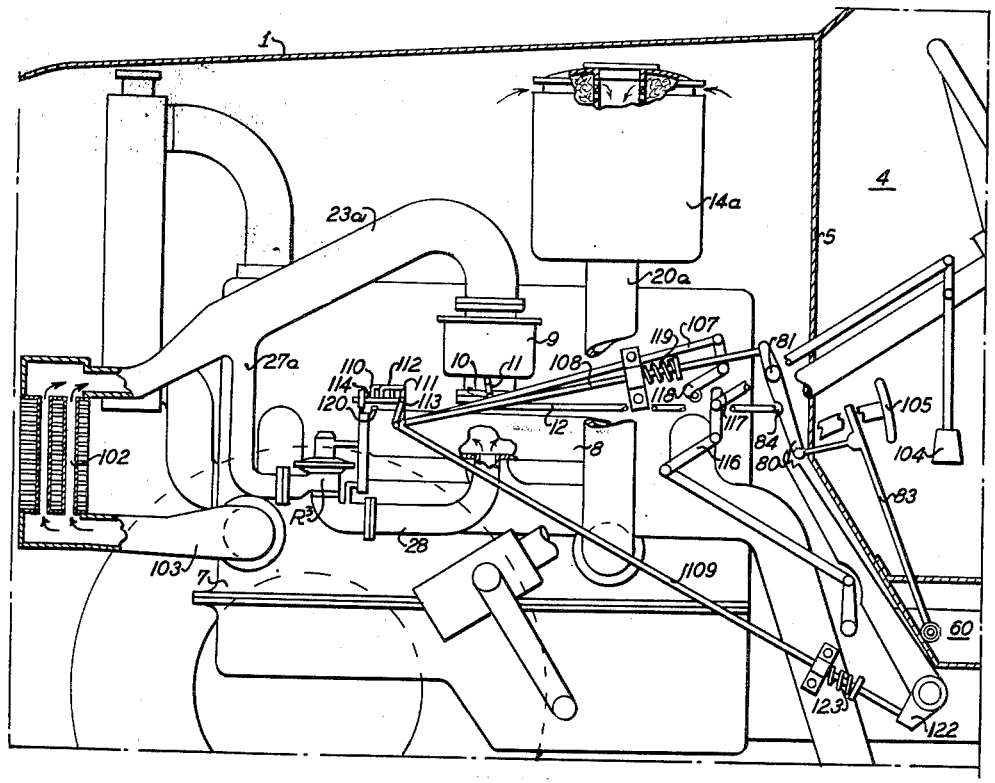
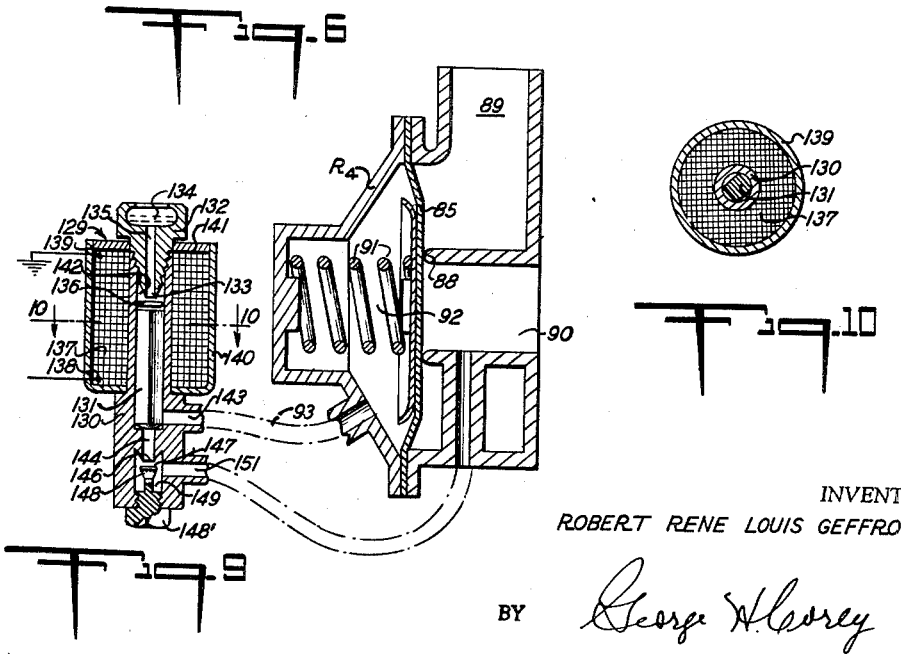
INVENTOR
ROBERT RENE LOUIS GEFFROY
BY George H. Corey
ATTORNEY April 19, 1960
R. R. L. GEFFROY
2,933,075
APPARATUS FOR CONTROLLING THE FLOW OF
AIR TO THE INTAKE MANIFOLD AND THE
IGNITION OF AN AUTOMOTIVE ENGINE
Filed March 12, 1956
5 Sheets-Sheet 4
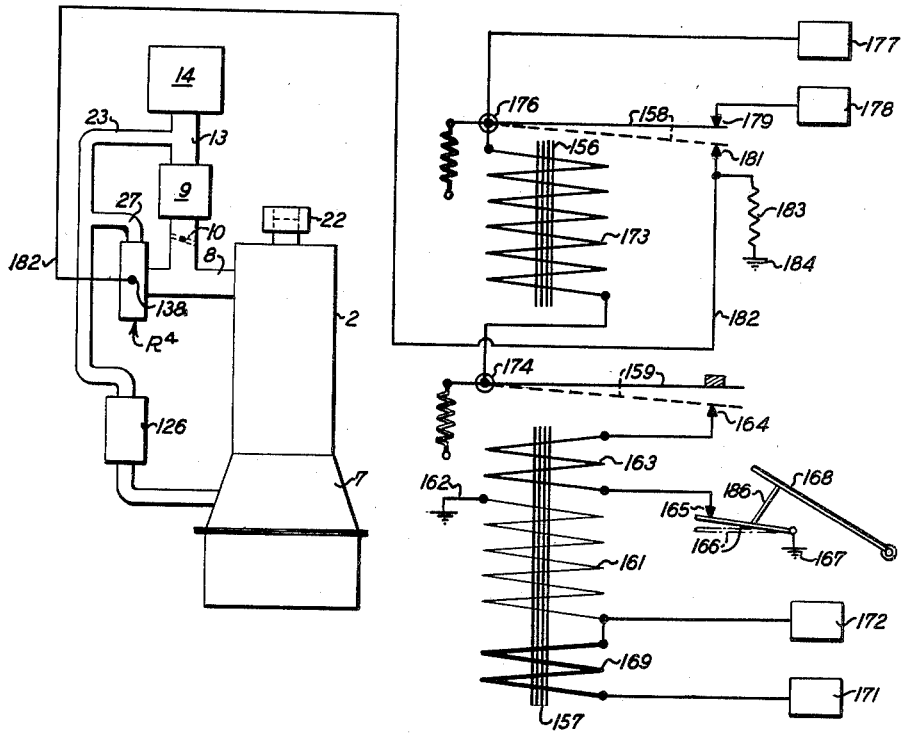
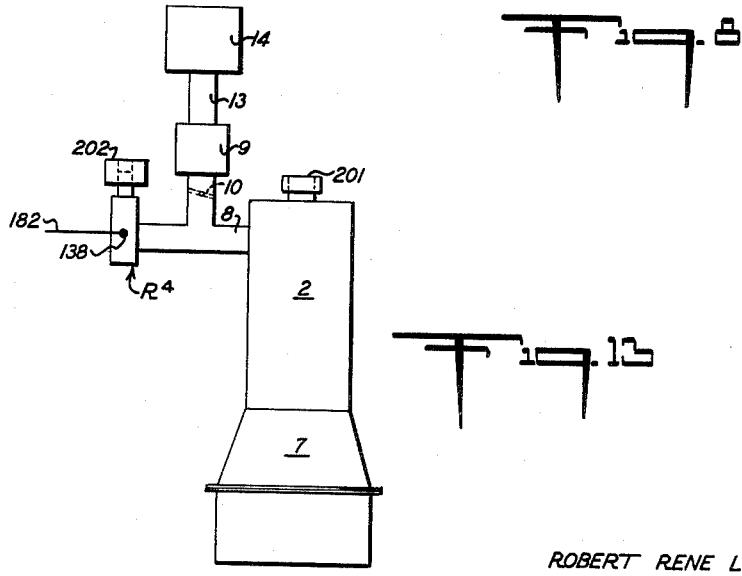
INVENTOR
ROBERT RENE LOUIS GEFFROY
BY George H. Corey
ATTORNEY April 19, 1960
R. R. L. GEFFROY
2,933,075
APPARATUS FOR CONTROLLING THE FLOW OF
AIR TO THE INTAKE MANIFOLD AND THE
IGNITION OF AN AUTOMOTIVE ENGINE
Filed March 12, 1956
5 Sheets-Sheet 5
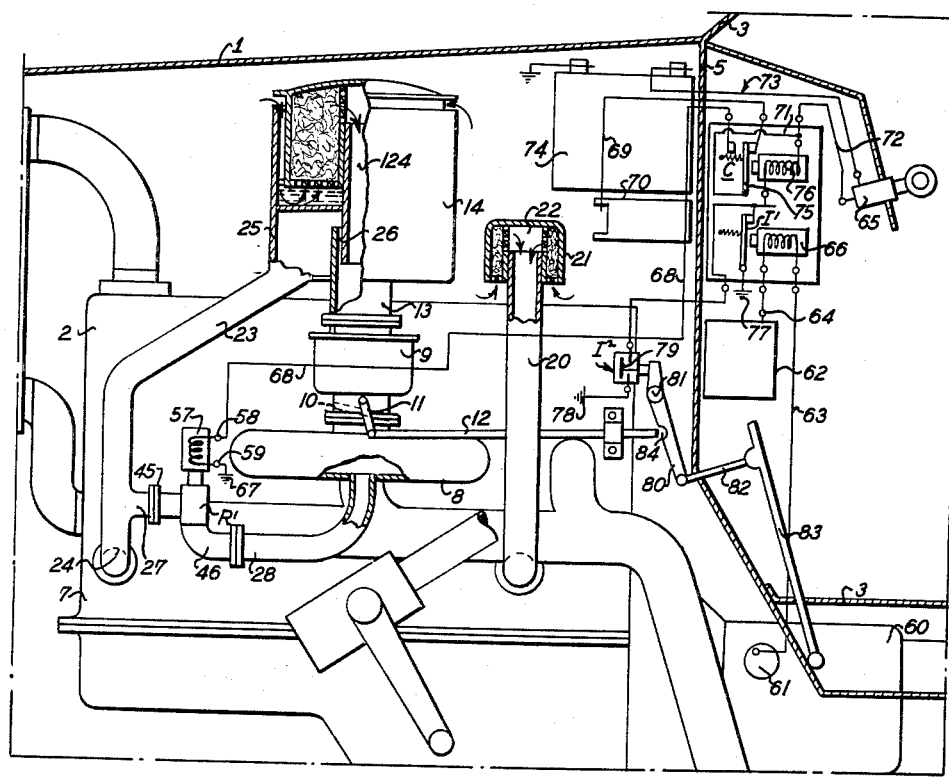
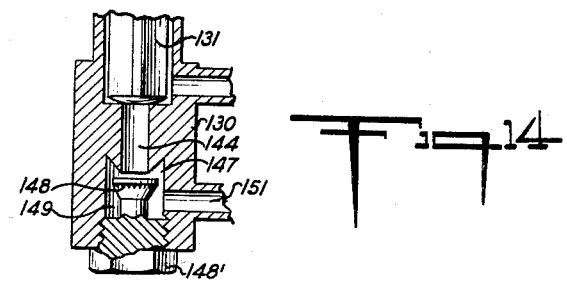
INVENTOR
ROBERT RENE LOUIS GEFFROY
BY *George H. Corey*
ATTORNEY United States Patent Office 2,933,075
Patented Apr. 19, 1960

2,933,075
APPARATUS FOR CONTROLLING THE FLOW OF AIR TO THE INTAKE MANIFOLD AND THE IGNITION OF AN AUTOMOTIVE ENGINE

Robert René Louis Geffroy, Neuilly-sur-Seine, near Paris, France

Application March 12, 1956, Serial No. 570,907

Claims priority, application France December 24, 1952

21 Claims. (Cl. 123—97)

The present invention relates to internal combustion engines and more particularly to apparatus associated therewith for preventing the escape into the surrounding atmosphere of noxious gases and vapors that collect or form in the crank case. It further relates to an arrangement for insuring the automatic introduction of air into the intake manifold at or near atmospheric pressure during deceleration of the engine and/or braking of a vehicle with the engine.

In the conventional prior art arrangements, the emanations of noxious gases and vapors from the crank case are usually eliminated by means of a tube leading from the crank case to the outside or may be allowed to escape into the space surrounding the engine through the oil-filling port.

Although a satisfactory piping-off arrangement usually can be made for a stationary installation, the problem is more complex for engines installed in self-propelled vehicles and especially for automobiles and trucks in which the engine is customarily enclosed within a hood or similar enclosure adjacent the driver's compartment of the vehicle. Because of the necessity for the passage of certain of the operating connections through the wall separating the driver's compartment and the space surrounding the engine, there is always an opportunity for more or less leakage of gases from the engine space past the separating wall into the driver's compartment. In the case of conventional automobiles and buses wherein the interior of the body of the vehicle is freely open between the driver's seat and the space for the other occupants any noxious gases passing under the hood into the body of the vehicle serve to contaminate the entire atmosphere within the body of the vehicle.

On automobiles and similar vehicles up until the present the accumulation of noxious gases and vapors within the space surrounding the engine has been sought to be eliminated by providing a tube connected with the crank case and projecting to the outside of the engine enclosure beneath the engine. When the vehicle is moving, the tube is subjected to a partial vacuum effect and aspirates the atmosphere within the crank case, and, in some cases, produces more or less of a sweeping current of air through the crank case by drawing in air through a second port, as, for example, through the oil-filling port.

Other devices, more or less complicated, have been proposed for use in automobiles but, in general, even where the known devices may be fairly efficient with new engines and bring about withdrawal of the noxious emanations from the crank case and their discharge to the atmosphere without undesired seepage into the driver's or passenger compartment of the vehicle when the vehicle is moving at a normal speed, they are insufficient even with new engines when the engine is being operated under heavy load conditions such as those corresponding to quick accelerations and when going up hills, because the amount of the emanations is much greater when the engine is laboring heavily. A similar action takes place when the engine is being used as a brake in going down hills. Moreover, when the vehicle is standing with the engine idling or is traveling at slow speeds under heavy load conditions there is not only the question of a greater volume of emanations but also there is a greatly increased opportunity for the emanations to distribute themselves beneath the hood of the engine and then penetrate to the body of the vehicle where they may cause discomfort and even illness to the driver and the passengers. When the engine is no longer new there is, of course, a greater tendency for the noxious gases to collect in the crank case, especially because of the wear that arises between the pistons and cylinders, and the opportunity for escape of the noxious gases from the engine crank case into the space surrounding the engine becomes greater due to the wear of the bearings, imperfections arising in the gaskets sealing the crank case from the outside, etc.

The intake manifold is functionally positioned between the cylinders and carburetor of an engine and by means of low pressures developed in the cylinders, draws the fuel mixture from the carburetor to the cylinders. The partial vacuum created in the intake manifold is the direct function of the speed of the engine except that it is reduced by increasing the throttle opening to the carburetor and thus at high engine speeds when the throttle tends to be completely open there is only a slight vacuum in the intake manifold. However, during deceleration of the vehicle, when the vehicle is pushing the engine or the engine is being pushed by the inertia of its own fly-wheel and the throttle is in its normally closed position, a much greater vacuum is created in the intake manifold because the engine is being driven at a high r.p.m. but little relief of the vacuum is offered through the throttle. Deceleration is used broadly herein to indicate that an engine is being operated at a higher rate of speed than the particular throttle opening would permit under influence of the fuel only. This condition could possibly include absolute deceleration when the engine acts as a brake for a vehicle going down a steep incline. The engine will also be referred to in this condition as passively driven in contrast to being actively driven by fuel explosions.

There have been various methods for relieving these high intake manifold vacuums that occur in deceleration but none lower the vacuum below about 11" of mercury since heretofore it has been generally considered desirable to always have a substantial vacuum in the intake manifold.

One of the outstanding problems of internal combustion engines also has been the gradual build-up of carbon deposits in the combustion chambers during the life of an engine which gradually reduces the efficiency and is largely responsible for the deterioration of the engine. In fact, in the construction of an engine, particularly in considering the fuel compression ratios of the cylinders, allowance is made for these eventual carbon deposits so that even a new engine does not realize its full potential.

The exact reasons for these carbon deposits are not known to the art although it is felt that incomplete combustion of the fuel mixture plays a large role. In addition, the drawing of excess oil past the piston rings and along the valve stems, particularly during deceleration when higher vacuums are built up in the intake manifold and the cylinders, may contribute to the formation of carbon deposits.

Much effort has been made and many suggestions reported on how to reduce or eliminate the deposition of carbon on the surfaces within the combustion chambers of the internal combustion engine but until the present time no feasible method has been presented and the industry continues to search for an answer to the problem. An aging engine can produce a more nearly normal output by gradually increasing the octane rating of the gasoline but this is expensive and only satisfactory for a relatively short period of time.

The present invention has for an object to provide an improved device or system for preventing discharge into the space surrounding the engine of noxious gases or vapors developed in the crank case or which have passed into the crank case from the ignition chambers.

It is a further object of the invention to provide a device of the type described which operates equally as effectively and positively throughout all conditions of operation of the engine and the vehicle propelled thereby, and especially when the vehicle is standing still as well as when it is traveling slowly with the engine under heavy loads or with the engine acting as a brake to reduce or control the speed of the vehicle.

It is a still further object of the invention to provide a device of the type described whereby a partial vacuum is created in the crank case during the operation of the engine and such partial vacuum is regulated and maintained so as to prevent discharge outside the engine and the crank case assembly of any noxious emanations of the crank case during any and all working conditions of the engine and irrespective of whether the vehicle is traveling at high or low speeds or is standing still.

It is another object of the invention to particularly and directly utilize the intake manifold vacuum during deceleration for creating a vacuum in the crank case.

It is also an object of this invention to reduce the vacuum of the intake manifold during deceleration close to atmospheric pressure by opening a passage of relatively wide cross-section from the intake manifold either directly or indirectly to the atmosphere or a similar source of pressure.

It is an additional object of the invention to reduce and practically eliminate the build-up of carbon deposits within the combustion chambers of an internal combustion engine.

It is a further object of the invention to provide a throttle arrangement whereby the manipulation of the throttle valve is automatically controlled, during deceleration and/or braking of the vehicle by means of the engine and in changing from one of such operating conditions to a condition of normal operation of the engine for driving the vehicle, in predetermined synchronism with the activation and de-activation of the ignition circuit so that undesired ignition of accumulated fuel vapours with resultant surging is prevented during such stages of deceleration and/or braking.

It is a still further object of the invention to provide a novel switch arrangement responsive to movements of the accelerator or other fuel feed control means for shutting off or re-establishing a flow of fuel through the carburetor or other fuel supply means in synchronism with predetermined changes in the operating conditions for the engine.

Other objects and advantages will become apparent from the detailed description and the appended drawings wherein:

Fig. 1 is a part vertical section and part side elevation of the forward end of a conventional type of automobile showing one embodiment of the present invention so associated with the cooperating parts of the engine as to bring about crank case ventilation along with regulation of the vacuum at the intake manifold;

Fig. 2 is a part vertical section and part side elevation on a larger scale of a vacuum regulator forming part of the combination shown in Fig. 1;

Fig. 3 is a part vertical section and part side elevation of the forward end of an automobile having provisions for automatic change of the speed regulating device and showing in association therewith a modified form of the vacuum device for controlling the disposal of the noxious emanations from the crank case;

Fig. 4 is a vertical section on a larger scale of the vacuum valve closing device shown in the vacuum device of Fig. 3;

Fig. 5 is a part vertical section and part elevation of a modified form of the vacuum valve and the control therefor adapted to be used in an engine installation of the type shown in Fig. 3;

Fig. 6 is a part vertical section and part side elevation of still another embodiment of the vacuum regulating system of the invention applied in this case to an automobile engine and speed regulating device therefor comprising manually operated change speed gears;

Fig. 7 is a side elevation with parts broken away in section of a vacuum valve and operating mechanism therefor adapted to be used in the assembly shown in Fig. 6;

Fig. 8 is a diagrammatic view of an additional embodiment of this invention applied in a vacuum control system so associated with the intake manifold and the crank case as also to produce crank case ventilation;

Fig. 9 is a vertical section on a larger scale of a further embodiment of a vacuum valve and solenoid control therefor adapted to be used in a control system of the type shown in Fig. 8 as well as in the other embodiments of the control system of the present invention;

Fig. 10 is a section taken along line 10—10 of Fig. 9;

Fig. 11 is a part side elevation and part section through an improved switch device that is particularly designed for use in the accelerator circuits of Figs. 3 and 8 of this invention;

Fig. 12 is a horizontal section on line 12—12 of Fig. 11;

Fig. 13 is a schematic showing of a vacuum control system, with the electrical control circuits omitted, generally similar to that shown in Fig. 8 except that the control of the vacuum in the intake manifold is obtained by use of connections which open directly to atmosphere and do not involve simultaneous crank case ventilation; and Fig. 14 is a vertical section on an enlarged scale of the valve connections associated with the electromagnetic pilot of Fig. 9 for controlling operation of the regulation valve 127 under the master control of the electric circuit arrangement of Fig. 8.

In certain of its aspects the invention consists in a system wherein the crank case is provided with conduit connections which connect it in parallel, on the one hand, directly and permanently with the air inlet port and the air intake of the engine, and, on the other hand, connect it to the intake manifold through a closing device which is adapted to be moved to the open position only when the engine is being driven by the vehicle itself and is acting as a brake to restrict the movement thereof.

In another of the important aspects of the invention as applied in producing crank case ventilation, the interior space of the crank case is maintained under partial vacuum in comparison to the surrounding atmosphere throughout all of the working conditions of the engine, so that all noxious gases are withdrawn as fast as they collect or form in the crank case and are transmitted through the conduit connections to the intake manifold of the engine or they mingle with the fresh combustion mixture and are passed into the combustion chambers for eventual discharge through the exhaust pipe for the engine.

In another and one of its broader aspects the invention includes means for reducing the vacuum of the intake manifold to substantially atmospheric pressure when the engine is decelerating. This occurs in the normal operation described herein of withdrawing noxious gases from the crank case. However, this reduction or elimination of manifold vacuum during deceleration may be realized according to my invention without regard to the crank case ventilation, i.e., atmospheric pressure or substantially atmospheric pressure may be supplied from any available source including the atmosphere as well as the crank case. In fact, the advantages of this aspect of the invention are frequently of greater interest than the advantages secured from a full cycle sweeping of the noxious gases from the crank case.

I have further found that the elimination or substantial and prompt reduction of the vacuum in the manifold during deceleration of the engine insures practically no build-up of carbon deposits within the combustion chambers, and although there may be a slight build-up for a short period of time, this appears to be subsequently eliminated before it becomes thick enough to substantially impair the efficiency of the engine.

Referring more particularly to the embodiment shown in Figs. 1 and 2, wherein the invention is shown as applied to an internal combustion engine mounted within the hood space of an automobile of which the front part is represented schematically, the hood 1 is shown as extending over the engine 2 mounted on the front end of the chassis of the vehicle which has a body 3 with a space 4 for the driver in the part thereof adjacent the engine. This space is separated from the engine space by a wall 5 which is perforated for the passage of the steering post 6 as well as for the conventional connections (not shown) to the throttle and the transmission.

Regulation of the flow to the intake manifold 8 of the mixture of fuel and air formed in the carburetor 9 according to the working conditions for the engine is insured by the throttle valve 10 located in the duct connecting the intake manifold to the carburetor 9. The throttle is connected by means of lever 11 and rod 12 to an accelerator pedal, not shown.

The air for combustion of the fuel is aspirated through a duct 13 to the carburetor from an air filter unit 14. The air enters the filter at the point 15 and passes downwardly through an annular passage 16 into an oil seal 17 and thence upwardly through a mass of filtering material 18 after passing beneath the lower edge of the inner wall 19.

The wall 19 delimiting the air passage 16 depends for a short distance, which may be of the order of 3 mm., beneath the surface of the oil seal so that the filter creates a small pressure drop, which is noticeable when there is a feeble flow of air at slackened speed but which increases very little with increase in the air flow so as not to interfere with the carburation.

The usual oil-filling pipe 20 is provided with a cap 21 containing within an annular space therein a suitable filter material 21a. The cap 21 is provided with an annular perforated wall 21b concentrically arranged relative to the outside wall of the cap and defining a central opening which receives the upper end of the pipe 20. The cap also carries a gauged port element 22 which fits within the end of the pipe 20 when it is in seated position. The gauged port 22 imposes a pressure-drop on the air flowing therethrough which for very low speeds is less than that created in the main air filter 14 by the oil seal 17 but which rapidly increases with increase in the air flow, whereas the pressure-drop of the main air filter 14 varies only very slightly with variations in the volume of air passing therethrough.

The crank case 7 is also connected permanently with the main filter casing 14 by a pipe 23 opening at one end directly into the crank case at a point 24 above the normal oil level therein and at the other end opening into an annular chamber 25 in the lower part of the filter unit 14. This chamber communicates directly with the aspiration duct 13 through the restricted annular passage 26.

A second connection between the crank case and the intake manifold 8 is provided by the branch pipe connection 27, a regulating closure device R and a pipe connection 28.

Fig. 2 shows the regulator R on a larger scale. The regulator is constructed and adjusted so as to establish direct communication between the crank case 7 and the intake manifold 8 through the conduit 27, the regulator R and the conduit 28 only when the depression in the manifold reaches a certain predetermined value. The direct communication then established arrests any tendency to exceed that maximum while aspirating into the crank case 7. This maximum will be given later on.

The regulator R as shown comprises upper and lower body members 29a and 29b having annular cooperating flange portions 29c and 29d between which is interposed the peripheral portion of a resilient diaphragm 30. The diaphragm 30 is urged into seating engagement with a circular rib 29e by a spring 31 bearing at its upper end against a thrust plate 32 which is adjustable by means of a screw 33 extending through a threaded opening at the top of the member 29a. The screw is also held in a predetermined position of adjustment by a gas tight fitting 34.

When the diaphragm 30 seats on the rib 29e, it determines four chambers within the regulator. First, there is the upper chamber 35. Second, there is a central chamber 36 located under the diaphragm and permanently connecting by a connection 37 with the branch connection 27. The third chamber 38 is defined between that portion of the member 29b that is outward with respect to the rib 29e and the adjacent annular portion of the diaphragm 30. The fourth chamber 39, likewise of annular shape, is defined between the downwardly extending cylindrical portion of the member 29b and a concentrically arranged open ended cup-shaped member 40 having an inner peripheral edge portion secured between abutting surfaces of the member 29b and the connection 37. The member 40 has an outlet connection 41 opening from one side thereof and establishing a connection through the pipe 28 with the intake manifold 8. The member 40 is provided also with an outlet fitting on the opposite side thereof for establishing communication with the upper chamber 35 through the pipe 42. The chamber 39 is also in continuous communication with the annular chamber 38 by means of a plurality of openings 43 through the wall of the member 29b suitably spaced around the rib 29e.

It will be seen that that part of the diaphragm 30 which is located outside the seating rib 29e is subjected to the same pressure (that prevailing in chambers 35, 38 and 39) and, therefore, is in indifferent balance, so that the diaphragm's position at any time depends on the following opposing actions:

(a) The pressure P prevailing within pipe 23 and the chamber 36 and which acts on the lower side of the central part of the diaphragm.

(b) The pressure $P_1$ prevailing within the intake manifold 8 and the chamber 35 and which acts on the upper face and outer circular portion of the lower face of the diaphragm.

(c) The pressure exerted by the spring 31 which is added to that exerted by the gaseous atmosphere within the chamber 35 and for convenience is designated as pressure $P_2$.

By "pressures" as used herein is meant the pressures above absolute vacuum, which are in fact depressions as compared with atmospheric pressure, and are prevailing at all times within pipe 23 and the intake manifold 8.

It will be understood from what has been said above that the diaphragm 30 is maintained against its seat 29e so long as $P<P_1+P_2$. The absolute pressure $P_1$ (a depression in comparison to the atmosphere) prevailing within the intake manifold 8 varies with the working conditions of the engine. It is only a few inches of mercury lower than the atmospheric pressure when the engine is working under full load or full open throttle conditions. When the throttle is closed, as in braking, the vehicle by compression of the engine or during idling, the depression may reach a value of around 21 inches of mercury.

The operation may now be described as follows: The depression prevailing in the intake manifold 8, combined with the opening of the carburetor throttle 11, determines within the air inlet duct 13 for the carburetor a suction of air which is low at slackened or idling speeds but increases with the power required from the engine and reaches its maximum at full speed and full load. This suction determines a flow of air through the air cleaner 14. This flow varies directly with the engine's suction and secures the air requirements of the engine. Because of this suction, a depression is created on the upstream side of the carburetor, in chamber 25 for instance, and it is transmitted through the pipe 23 in such a way that the aforesaid absolute pressure P prevailing within this piping is lower than atmospheric pressure by the amount of said depression.

Piping 23 opens at 24 into the crank case 7. The crank case is, therefore, subjected to this same depression and a gaseous flow is then established between crank case 7 and chamber 25, in the direction of arrow $f^1$, from the crank case. For every working condition, the flow within pipe 23 depends on the extent to which air may be sucked into the crank case and the volume of emanations found therein, which are composed of the leaks between cylinders and pistons and of oil vapors. Calibrated port 22 of the oil filling pipe 20 insures, in cooperation with the possible leaks from the atmosphere into the crank case, the inlet of fresh air into the crank case which compensates at every moment for the tapping off effected by the pipe 23. Since the pipes 23 and 20 open into the crank case at places very far apart, it is insured that the crank case is truly swept by the gaseous draught created therein.

When the engine is operating at full load with the throttle 10 wide open, the volume of air sucked through the main air cleaner 14 is large, the suction is strong and the crank case remains under depression through the effect of this suction whatever be the amount of leaking of gases between the cylinders and pistons, because these leaks are negligible compared to the volume of air sucked in at 13. On the contrary, at slackened speed, the volume of air sucked into the inlet of the carburetor at 13 is low. However, some depression occurs within the crank case 7 due to the initial pressure drop in the air cleaner 14 which induces suction in the crank case 7, and also to the fact that the volume of emanations from the crank case at slackened speed is much smaller than that of the air sucked in during the same time. The gauged port 22 also plays a part in this.

As a matter of fact, because the auxiliary air filter 21 causes practically no initial pressure loss, whereas the initial pressure loss caused by the main air filter 14 is set (for example, at a value equal to a head of 0.12 inch of oil), a priority of suction is automatically obtained at slackened speed across the crank case 7 for the fumes emanating there and optionally for some part of the amount of air sucked by the carburetor, this air entering through filter 21 and port 22, as well as through any leaks in the crank case. It is better to regulate the values of the pressure losses of the main air filter 14 and of the auxiliary filter 21 (provided by its calibrated port 22) in such a way that, as soon as the lowered indraft of air through filter 21 at slackened speed occurs, the depression within the crank case drops to a value corresponding to the pressure loss in the filter 14. It follows that the main air filter or cleaner 14 insures part of this flow from the beginning of slackened speed. Lacking this caution, there would be a risk of interfering with the carburation because of changes in the progression of pressure losses according to the flow at the carburetor inlet. Afterward, for all loads above the starting of its air flow, the main air filter 14 will insure almost all of the air required to be aspirated by the engine, because by construction the increase of its pressure losses according to the flow is low, whereas the increase of pressure losses is high for the auxiliary filter and its gauged port 22.

Suction in the crank case 7 is thus insured at slackened and idling speeds in an efficient way, since it can go to the point of sucking through the crank case an important proportion of the low amount of air entering the engine at such load, while, without any perceptible change in the carburation, this proportion becomes automatically low for all higher loads of the engine. The cross-section of the gauged port 22 depends on the extent of sweeping by fresh air required for the good thermic balance of the mechanical parts and the lubricating oil for the engine.

It will be noted that in the case where this good equilibrium may be obtained without the sweeping with air, the air inlet orifice 22 may be suppressed as well as the air cleaner 21. In such a case, the tube 23 discharges only the crank case emanations, possibly mixed with air coming from any crank case leaks, and the interest of having the crank case under depression remains the same.

The device of the present invention thus makes it possible, for all working conditions of the engine during which the regulator R remains closed, to keep some depression within the crank case. This depression is very low at slackened speed, about four to ten or twelve hundredths of an inch of mercury at most, but it is sufficient, because emanations from the crank case at slackened speed are not large, and the vehicle's speed being low, there are no risks of sufficient air turmoils around the engine to disturb the pressure ratio between the inside and the outside of the crank case. For higher loads the depressions within the crank case increase with the carburetor suction, that is to say, with the speed and the engine load, while remaining controlled by the main air cleaner 14. Such depressions therefore reach values much higher than those at slackened speed, say a few inches of mercury. Their increase with the engine's load and speed, and likewise with the speed of the vehicle, insures in a positive way the presence of sufficient depression within the crank case, whatever be the volume of the emanations and the extent of the air turmoils around the engine caused by the speed of the vehicle.

On the contrary, with passive working conditions of the engine, as when at various speeds the engine acts as a brake on the vehicle, the flow of gases sucked by the carburetor 9 is not high enough for absorbing positively and at every moment all emanations from the crank case. In fact, when the engine is driven and acts as a brake, the factors determining the crank case depression are very slightly different from those of slackened speed alone. To be specific, if at slackened speed a very low depression in the crank case is enough for positively insuring that crank case emanations will not be rejected outside, and instead will be completely absorbed when mixed with the air fed to the engine, it is no longer the case when the vehicle is driven, because the air turmoils which occur on the outside of the crank case by reason of the speed are important and may make the depression within crank case lose all its value. For instance, as over pressure of 0.4" of mercury at the inlet of the air cleaner 14, normal for a speed of 50 miles per hour, would convert a depression of 0.04" of mercury within the crank case at slackened speed, into an over-pressure, for the engine driven at said speed, amounting to 0.4"−0.04" or .36" of mercury. The suction circuit in the crank case would then invert itself and air coming from the cleaner 14 would pass through the crank case, drawing along all emanations therein and discharging them through cleaner 21 under the hood as well as through leaks in the crank case. The difference in the depression in the crank case when the engine is operated at slackened speed and at the various speeds of the driven engine may be attributed to the fact that the emanations from the crank case, which are of the same order at slackened speed as when the engine is driven under low loads for an engine in normal condition and at normal temperature, become much more important when the engine is driven under heavier loads and the engine is worn or very hot, as after an extended journey at full load and under high ambient temperatures.

Lastly, experience has proved that every time the engine passes from full load working conditions to conditions where the engine is driven by the momentum or gravity pull of the vehicle, as in braking with the engine, the crank case emanations are not absorbed as quickly as they are produced, due to the reduction of air volume sucked in by the carburetor. The result is a short-lived over-pressure within the crank case which causes a gust of deleterious gases to be expelled.

In order to avoid all such troubles and to obtain surely a depression under all conditions in which the engine is driven by the vehicle, it is necessary to produce in the crank case a depression higher than the one suitable to slackened speed, which is necessarily very low so as not to trouble carburation. This is the part assigned to the closing device constituted by regulator R.

During the engine's passive working conditions, pressure $P_1$ drops sufficiently within the intake manifold 8 so that pressure P becomes preponderant over diaphragm 30, which from now on operates as a regulator diaphragm, by creating a communication between connections 37 and 41. This communication is adjusted automatically for keeping pressure $P_1$ in the vicinity of the figure for which spring 31 is calibrated, which is to say slightly under pressure $P_1$ at slackened speed, about 9 inches of mercury, absolute. The intake manifold 8 is thus put in controlled communication with crank case 7 in which is produced a suction that increases with the speed at which the engine is driven.

The combination with the air filter 14 of the carburetor 9, the air cleaner 21, the crank case 7 and the calibrated port 22 then operates in the same way as under active working conditions, except that the air flow in tube 23 is reversed and then occurs from air filter 14 to connection 27, thereby insuring an excess of depression which increases with the engine's driven speed. The result is that when the engine is driven by the momentum and inertia of the car and whatever be the car's speed, the depression within the crank case, the withdrawal of emanations from the crank case and their absorption by the engine, are all maintained.

Thanks to the reversing of the direction of flow of the gases within tube 23, the crank case emanations produced, when the engine is driven and operates as a brake, are absorbed by the engine without going through the carburetor. This is desirable, because these emanations strongly clog the carburetor, especially around the throttle, by reason of the amount of hard carbon deposits that they leave, probably because of the well-known bad combustion when the engine acts as a brake. Lastly, the enrichment with air of the mixture entering the engine when it acts as a brake, that is insured by the depression regulator R, seems to improve the combustion of this mixture and therefore contributes to the decrease of clogging of the engine's ignition chambers by carbon deposits.

Moreover, this combination insures the following advantages:

It decreases the mechanical wear by reason of the very efficient lubrication of the valves and cylinder heads by oil vapors, removes combustion residues immediately from the crank case by means of the sweeping air, and cools the valves and cylinder heads during the engine's passive runs.

Additionally, a reduction of oil consumption is made possible, on the one hand through recovery of condensates in the circuit between the crank case 7 and the carburetor by means of a condenser which may for example consist of chamber 25; and, on the other hand, by decrease or elimination of leaks.

The invention also insures improved cleanliness of the engine through elimination of oil leaks past the crank case joints and bearings and of greasy deposits usually produced under the hood 1 through condensation of fumes escaping in this manner or through the oil filling port.

Figs. 3 and 4 show a modification in which is again found a device for placing the crank case 7 under depression by means of the air filter 14, the carburetor 9, and the crank case auxiliary air filter 21 which is provided with its gauged port 22. In this arrangement the regulator R of the first example is replaced by a depression valve $R^1$. Under all working conditions when the engine rotates of itself, either during idling or during driving of the car at more or less speed, the assembly: the air cleaner 21, the gauge port 22, the oil filling tube 20, the crank case 7, the conduit 23, chamber 25 and the carburetor air cleaner 14, operates exactly as described for the first example and gives the same advantages. On the other hand, when the engine is no more operating by itself and is driven by the car, it is the depression valve that comes into play.

This depression valve $R^1$ (Fig. 4) comprises a body 44 associated with an intake tube 45, for connection to the branch 27 of tube 23, and with an outlet tube 46 connected to connection 28 of intake manifold 8. A seat 47 is provided between both tubes and a valve 48 provided with a seating unit 49 and with a shock-absorber 50 cooperates with the seat 47. This valve is integral with a rod 51 which is guided within body 44 and terminates in a head 52. The head 52 is located in a longitudinal bore 53 formed in a mild iron piece 54, itself movable within bore 55 of a cylindrical skirt which forms an extension of body 44 and is made of non-magnetic metal. Upon this skirt is arranged an excitation coil 57 whose opposite ends are connected to terminals 58 and 59. The coil is held in place by means of a nut 57a screwed onto skirt 56.

The arrangement is such that the movable core 54 rests on a seat at the bottom of the bore 55 when the coil is not excited. When the electric circuit is closed through coil 57, the core 54 is strongly urged upwards. In order to counteract the action of depression prevailing in the intake manifold and which, by means of tube 46, acts upon valve 48 so as to keep it on its seat 47 and in order to avoid an excessive number of ampere-turns in coil 57, the bore 55 in the core is sufficiently deep so that its bottom is some distance below the valve-stem head 52 when the valve is at rest in closed position. In this way advantage is taken of the inertia acquired by the core 54 when it is urged upwardly by the magnetic field of coil 57 for producing, upon head 52, an impact that facilitates the upraising of valve 48. The lifting and dropping movements of the valve are thus insured by the closing or opening of the electric circuit supplying coil 57.

In the example of Fig. 3, which shows a car provided with an automatic change-speed transmission of the "Fluid Drive" type, used in the 1948 models of the Chrysler, Dodge and De Soto automobiles, there is represented a mode of embodiment of the feeding circuit of coil 57 and of the control of this circuit.

On this figure are identified the speed changing transmission 60, the speed regulator 61 and a box 62 containing the electric controls of the transmission. The speed regulator 61 and the box 62 are connected directly, when the car does not include the present invention, by a wire 63 which effects grounding through regulator 61 of a terminal 64 of box 62, during all times when the vehicle is stopped or runs under a predetermined speed limit, say, about 10 miles per hour, the ignition switch 65 being turned on. On the contrary, according to the present invention, the grounded terminal 64 of the box 62 is not connected directly to the regulator 61 but instead a coil 66 of a relay circuit is interposed in the conductor 63 between the terminal 64 and the regulator 61. The wire forming the coil and the conductor is large enough in cross-section not to introduce any complications with regard to the normal operation of the electrical controls for the transmission contained in the box 62.

The terminal 59 of coil 57 is suitably grounded as shown schematically at 67, while the other terminal 58 is connected by means of a conductor 68 to one of the two contact studs of a contactor C, the other stud being connected by a conductor 69 to the usual ignition coil 70 of the engine. The blade 75 of contactor C is connected to one pole of battery 74 by means of conductors in series 71 and 72, the usual ignition switch 65 for starting and a conductor 73, the other pole of the battery being grounded.

The blade 75 of contactor C is operated by a coil 76, connected by one of its ends to the battery 74 through conductors 72 and 73, whereas the other end may be grounded either (1) at 77, through a first switch $I^1$ whose movable part, normally spaced from its twin stud, is urged toward this stud by excitation of the aforesaid coil 66 of the relay interposed in circuit 64—63—61, in such a way that switch $I^1$ closes the circuit of coil 76 during all times when the vehicle is either stopped or traveling at a speed lower than said limit, the ignition switch 65 being on and, on the contrary, is open during all times when the car speed is higher than the adjusted point of regulator 61; or (2) such other end of the coil 76 may be grounded at 78, through a second switch $I^2$ which is in parallel with switch $I^1$.

This switch $I^2$ comprises a movable part 79, connected to a lever 80 set so as to oscillate around a stationary axis 81 and connected to the usual accelerator pedal 83 by means of a connecting link 82. It is this lever 80 which moreover actuates the rod 12 controlling the gas throttle 10. The arrangement is such that, when the pedal 83 is in the resting position, switch $I^2$ is open. Closure of switch $I^2$ occurs at the first push upon pedal 83. Preferably a slight clearance 84 is provided between lever 80 and rod 12 as a safety measure, to make sure that this contact is rightly established, rather before than after opening of throttle 10.

Operation is as follows: During all acceleration periods, switch $I^2$ is closed and relay 76 excited. The depression valve $R^1$ is closed because its excitation circuit is open. On the other hand, the ignition coil is normally being fed. The same thing happens, but this time by closure of switch $I^1$, as shown, during all periods when the vehicle is stopped, with the engine idling or again when the vehicle runs at a speed lower than that which releases regulator 61 because coil 66 is then being fed.

It is indispensable to have the closure of valve $R^1$ and the normal working of the ignition depend on regulator 61, because in the fluid drive system regulator 61 controls the passage to the lower speed which includes a free wheeling condition and the engine would stop if the restoration of its normal working conditions were not synchronized with the passage into the free wheeling state.

On the other hand, during all periods when the engine is driven by the car at a speed exceeding the limit of adjustment of regulator 61, switch $I^1$ is open and, as switch $I^2$ is also open, coil 76 is not excited. Contactor C then takes care of the closing of the excitation circuit of coil 57 of depression valve $R^1$ and that valve is opened at the same time as the circuit through ignition coil 70 is opened. The result is similar to the one obtained in the first example, from the point of view of the crank case being put under depression and ventilation, but it is more pronounced.

Depression valve $R^1$, when wide open, effectively produces a direct suction of the engine, instead of the controlled suction previously obtained with regulator R. This direct suction through tubes 28, 46, 23 acts simultaneously in crankcase 7 and on the downstream side of air cleaner 14, as well as on the upstream side of the carburetor, and determines the same deportment of the assembly comprising the crankcase air cleaner 21, the gauged port 22, tube 20, crankcase 7, tube 23 and carburetor air cleaner 14 as the one already described for the periods when the engine runs at full or average load, excepting the direction of flow $f^1$ in tube 23, which is inverted. The depression in crankcase 7 which results from this arrangement is higher than that produced by regulator R, and this increases the safety margin against escape of crankcase emanations.

Moreover, since the depression valve $R^1$ opens a direct passage, a new supplemental effect appears, namely, a rising of the pressure in the intake manifold 8 to the vicinity of the pressure in crank case 7, that is to say, slightly under atmospheric pressure. This pressure rise involves the effective disconnection of the carburetor 9, and determines the suppression of any gasoline consumption during the times when the engine is being driven and is acting as a brake on the forward movement of the vehicle. Besides the savings resulting from this new effect, there is the advantage of the practical disappearance of carbon deposits within the combustion chambers of the engine. Detailed explanations will be given later on about this assertion. There is also obtained a decrease or the elimination of the detrimental effect upon lubricating oil and mechanical parts caused when incompletely burnt products pass into the crankcase during these same periods.

Lastly, the fact that the circuit of the ignition coil 70 is cut during the times when the engine is acting as a brake and is being driven by the vehicle and the depression valve $R^1$ is open, makes it possible to avoid the occurrence of a surging action at the time this valve opens, under certain conditions of operation, particularly when the engine is cold and when gasoline condensates have accumulated in the intake manifold. In the presence of the flow of combustion-supporting gases produced by the opening of valve $R^1$, there would be a tendency for vigorous explosions before the engine became stabilized in its braking action. Such explosions are avoided because the ignition is cut.

$R^1$ in fact need not be connected to the crankcase at 45 but instead may open directly at this point to the atmosphere. The regulator could then operate without regard to the sweeping of the crankcase in a manner which will be more fully described in regard to $R^4$ in Fig. 13.

Fig. 5 shows a different embodiment of depression valve $R^2$ which may be arranged without any alteration in the assembly of Fig. 3 in place of valve $R^1$. According to this variation, the opening of the valve is pneumatic and caused, as that of depression regulator R in Fig. 2, by the increase of depression in the intake manifold 8 beyond the limit of about 21 inches of mercury corresponding to the engine operation at slackened speed, and its closing is initiated by the current passing in the circuit including the lead in wire 68, the coil 99 and the connection to the ground 67.

In this depression valve is again found a diaphragm 85 held between the half sections 86 and 87 and normally bearing against a valve seat 88. The regulator $R^2$ also includes the inlet tube 89, the outlet tube 90, a spring 91 and an adjusting-screw 91′. It is possible to choose at will to subject either the central portion or the annular portion of diaphragm 85 to the depression of the engine's intake manifold. In the example of Fig. 5, it is the central portion of the lower face which is subjected to this action. The upper chamber 92 containing spring 91 is itself put into communication with the intake manifold through tubes 93 and 94 and under the control of a valve 95 cooperating with a seat 96 and provided with a stem 97 which moves freely through the passage defined by said seat. This stem at its upper end is normally in contact with a vertical core 98, subjected to the action of coil 99 whose terminals 100 and 101 correspond to terminals 58 and 59 of valve $R^1$ of Fig. 3. Valve 95, which is very light, presses loosely against its seat 96 when the mild iron core 98 is attracted by coil 99. On the contrary, when the core falls by gravity it moves the valve downwardly and maintains it in the open position. The operation of this depression valve is as follows: When coil 99 is not fed, valve 95 is lowered and communication between chamber 92 and connection 90 is then established. The intake manifold's depression prevails over all the upper face of the diaphragm and over the central portion of its lower face. Spring 91 is calibrated by means of screw 91′ to a pressure corresponding to a pressure slightly higher than the pressure at slackened speed, e.g., about 21 inches of mercury with one car tested, so that the tightness of the seal on seat 88 remains unchanged during slackened speed. But the increase of depression beyond such figure, which is displayed as soon as the engine is driven either by its own fly-wheel's inertia, or the vehicle's inertia, produces a beginning of lifting of the diaphragm 85. Communication being thus established between connections 89 and 90, depression is strongly lessened within the intake manifold where the pressure again rises, while remaining lower than the atmospheric pressure. But at the same time, the movable core 98 is raised because the operation with the engine driven by the vehicle corresponds to the excitation of coil 99, as explained already for the example of Figs. 3 and 4. Valve 95, freed from the weight of the core, closes under the action of the gaseous flow which tends to establish itself from tube 94 toward tube 93 so as to balance the pressure between connection 90 and chamber 92.

As soon as the valve is closed, the chamber 92 under depression is isolated and the pressure rise upon the central portion of its lower face breaks the equilibrium which determines the diaphragm position, and this diaphragm rises widely and comes to abut against shell 87. This valve thus remains wide open as long as the depression which has caused its opening remains unchanged, that is to say, as long as the mild iron core 98 remains attracted by coil 99. Contrariwise, as soon as the electric circuit 68—99—67 is open, core 98 falls back upon the valve stem 97 and pushes valve 95 off its seat, whereupon the diaphragm 85 is again moved against the seat 88.

As may be seen, the depression valve $R^2$ secures results of the same order as does valve $R^1$. However, it may be mentioned that valve $R^1$ of Fig. 4 has a quicker opening than valve $R^2$ of Fig. 5, since it need not wait for the depression within the intake manifold to have reached a given value. On the other hand, it requires a more powerful operating coil than that used with $R^2$ of Fig. 5, which may be operated with a very weak coil and very low electric current consumption.

Figs. 6 and 7 show another embodiment of the invention. The circuit for putting the crank case 7 under depression is established according to an embodiment unlike the previous examples. Carburetor 9 aspirates directly to the crank case 7 through tube 23a, in series with a cooler 102 and a tube 103. The carburetor air cleaner, instead of being connected to the carburetor inlet, is installed in place of the auxiliary cleaner 21 of the previous examples, i.e., as 14a upon the tube 20a also used for filling the crank case. A depression valve $R^3$, as in the previous arrangements, is connected, on the one hand, to connection 28 of the intake manifold 8, and, on the other hand, by means of connection 27a to the tube 23a, that is to say, to the upstream side of carburetor 9. The cross-sections of the tubes 20a, 103, 23a and of the passages through cooler 102, must be wide enough so as not to cause perceptible pressure losses and lead to under-feeding of the engine. On the other hand, the example shown in Fig. 6 relates to a vehicle provided with a manual change-speed transmission. In such a case, the closing of depression valve $R^3$ is secured by mechanical connections productive of the following motions which may take place together or separately: First, the displacement of accelerator pedal 83 as in the case of Fig. 3; secondly, the putting to dead center of the lever 104 which controls the change-speed transmission 60; and lastly, the first displacement of the clutch pedal 105. These three driving parts: accelerator pedal, change-speed transmission and clutch pedal act, through respective rods 107, 108 and 109, upon three levers 110, 111 and 112 loosely mounted on the same shaft 113. Each of these levers may for its own account push downwards a lever 114 while drawing along against an opposing spring 115, a push-button 98a for opening valve 95a, similar to valve 95 in Fig. 5.

The connections of rods 107, 108 and 109 to the twin driving levers 104, 83 and 105 are the following ones:

Lever 104 controlling the change-speed transmission 60 operates a bell crank lever 116 carrying a cam 117 arranged so as to act upon a lever 118 to which is linked rod 107. The arrangement is such that rod 107 is operated for lowering push-button 98a when the change-speed mechanism is at dead center or in neutral position.

On the other hand, as in Fig. 3, the accelerator pedal 83 acts upon a lever 80 which oscillates around shaft 81. Actuated by a spring 119 the rod 108 also rests against said lever. As soon as the pedal 83 is depressed, the rod 108 is moved, drawing along lever 111 until lever 114 opens valve 95a and abuts against a stop 121 (Fig. 7). The acceleration pedal may then proceed with its normal operation, acting with a possible delay, due to its clearance 84 upon rod 12 operating the gas-throttle.

Lastly, the clutch pedal 105 has a heel 122 engaging one end of rod 109 which is urged against the heel 122 by spring 123, in such a way that, at the very first displacement of the pedal, rod 109 is pushed back by its spring 123 which draws lever 112 along and lowers lever 114 until it engages stop 121, thus opening valve 95a.

This embodiment insures, from the viewpoint of putting the crank case 7 under depression, a result similar to the one realized in Fig. 3, since this putting under depression proceeds from the same causes and remains controlled by the behaviour of the air cleaner 14a at various loads. However, the sweeping of crank case 7 is much more energetic since all of the air, whether sucked by the carburetor 9 or sucked by the depression valve $R^3$, passes through the crank case, while the well-known drawback of this energetic sweeping is corrected by the addition of the cooler 102, which is much more efficient than chamber 25 of Figs. 1 and 3. The cooler recovers by condensation the excess of oil vapors drawn along by the strong sweeping action, so that the embodiment of Figs. 6 and 7 insures, besides the advantages of the other modifications, an energetic cooling of oil and moving parts within the crank case.

The operation of the depression valve is in every way similar to that effected by the electric means shown by way of example in Fig. 3, except the disconnection of the ignition coil, which is not shown in Fig. 6, but might be obtained by closing its circuit with the higher position of lever 114 and opening it by its lower position.

Effectively, the depression valve $R^3$ is closed either when the change-speed lever 104 is at dead center or when the driver accelerates, or when he throws the clutch out. So, in each of these cases, the normal running of the engine is maintained. At the same time, the depression valve $R^3$ opens as soon as the depression within the intake manifold 8 exceeds the figure corresponding to slackened speed (e.g., about 21 inches of mercury), that is to say, as soon as the engine is driven by the vehicle, because such a condition corresponds to the positions in which none of the control levers acts upon valve 95a. In other words, when the acceleration and unclutching pedals 83 and 105 are at dead center and the change-speed gear lever 104 is in an active position.

Fig. 8 shows another embodiment of the invention applied in a system wherein the manifold vacuum regulation is accompanied by controlled depression of the pressure in the crank case and accompanying ventilation thereof. The circuit for establishing a crank case depression is very similar to the previously described embodiments and includes gauged port 22, crank case 7, pipe 23 leading to the duct 13, carburetor 9 and air filter 14, with an intake manifold 8 and a branch conduit 27 leading from the intake manifold to the depression valve $R^4$ and thence to pipe 23. This embodiment differs in its broad outline from the previously described embodiments by incorporating a separate oil condenser 126 in pipe 23 between crank case 7 and the branch conduit 27, and by a more simplified electric control of the depression valve. The oil condenser 126 may be made of a small steel box filled with metal wool or with any other means favorable to condensation of the oil vapors which will then run back into the crank case. Preferably, during operation of the engine, this condenser will be kept at a sufficient temperature—at least 176° F.—for allowing steam to escape and retaining only oil vapors.

This embodiment of the vacuum control system is also shown as including an improved arrangement of the depression valve $R^4$ and the solenoid control therefor and is shown in further detail in Figs. 9, 10 and 14. The depression valve $R^4$ will operate independently of the extent of the depression within the intake manifold; i.e., the opening and closing movements of the valve are practically instantaneous and depend on electric controls that are activated immediately when the engine is being passively driven. The depression valve $R^4$ which contains a diaphragm 85 is similar to that of Fig. 5 but the electromagnetic pilot 129 is different. The pilot has a nonmagnetic body 130 in which is loosely carried a mild iron core 131 of square cross-section that is subject to vertical displacement within the bore of the pilot body. The bore is closed at the top by a mild iron plug 132 which is threaded therein and provided at the lower portion with a seat 133 and at its upper portion with a dust filter 134. A rubber washer 136 is loosely positioned between the seat 133 and the core 131 to effect a sealing joint when the core is in raised position. An electric coil 137 surrounds the pilot body and is connected from terminal 138 to a source of electricity and grounded through terminal 139. The coil is surrounded by a mild iron armature 140, 141 to close the coil's magnetic circuit when the coil is supplied with a source of electricity. The core chamber 142 communicates with the diaphragm chamber 92 on the spring side of the diaphragm 85 through a passage 143 through the wall of the body 130. Immediately below the core chamber 142 is a restricted passage 144 in longitudinal alignment therewith which terminates at its lower end in a seat 146. A rubber washer 147 similar to washer 136 rests freely on a serrated supporting surface 148 on the upper end of threaded plug 148' in a position relatively close to but slightly spaced from and below seat 146 when it is not moved to seating position. Chamber 149 communicates through the passage 151 with the central passage 90 of the depression valve $R^4$ which is in direct communication with the intake manifold.

When the engine is being actively driven, which includes idling speeds, the coil 137 is not fed with electricity so that core 131 is positioned in the lower part of the core chamber and closes the restricted passage 144. The diaphragm chamber 92 is thus put in communication with atmospheric pressure through passage 143, chamber 142, around the square core 131, plug passage 135 and dust filter 134. The diaphragm 85 is thus forced against the seat 88 by the spring 91 and keeps the intake manifold closed. When the motor is passively driven by the vehicle or its own fly-wheel, current is fed through coil 137, whereupon the core 131 is attracted upwardly and closes the communication with the atmosphere by pressing the washer 136 against the plug seat 133 and consequently puts the diaphragm chamber 92 in direct communication with the intake manifold vacuum through the connections 90, 151, 149, 144, 142, 143 and 93.

The spring 91 is so calibrated as to yield as soon as the depression prevailing in the intake manifold reaches a predetermined value within chamber 92, whereupon diaphragm 85 rises from the seat. The pressure prevailing in 89, approaching the atmospheric pressure, causes immediately a flow of air through the port 90 into the intake manifold, and this admission of air abruptly opens widely the diaphragm 85, thus insuring a wide communication between the intake manifold and the atmospheric pressure through passages 90 and 89. As soon as this occurs the rise of pressure within passage 90 tends to create a flow of air from 90 through passages 151, 149, 144 and 143 toward chamber 92, but the light rubber washer 147 is immediately drawn against its seat 146 and thereby keeps the lower pressure entrapped within chamber 92 so that the depression valve remains open to admit substantially atmospheric pressure into the intake manifold. Of course, as soon as the current is cut from the coil 137 the core 131 will again fall and establish communication between the chamber 92 and the atmosphere through the opening 135 in plug 132 and thus cause the diaphragm 85 to move to seating position against the seat 88. Although not shown in Fig. 9 it will be understood that passage 89 is in communication with the branch conduit 27 in the assembly shown in Fig. 8.

Referring once again to Fig. 8, it will be noted that the electrical control of the depression valve $R^4$ is established automatically by conditions in the engine which occur only during passive action thereof. The control device, which may be associated in the same assembly unit with the valve $R^4$ and the electromagnetic pilot 129 or positioned as a separate assembly at a convenient place adjacent the engine, comprises two mild iron cores 156 and 157 that respectively attract movable blades 158 and 159. The core 156 and blade 158 form a relay, whereas the core 157 and blade 159 form a regulator.

The regulator includes a winding 161 of fine wire which is grounded at 162 and connected at the other end to the load regulator circuit. A second winding 163 of wire of intermediate diameter surrounds core 157 and is connected at one end to a terminal contact 164 through which connection may be effected by blade 159 to the relay circuit. The other end of winding 163 is connected to terminal contact 165 which cooperates with switch blade 166 to complete a circuit at ground 167 when the accelerator pedal 168 is in the resting position. A third winding 169 of relatively thick wire is traversed by the generator load current passing between the generator 171 and the load regulator 172. It will be appreciated that these three windings 161, 163 and 169 are so wound about core 157 that their effect is additive when the various operative circuits are closed.

The core 156 of the relay is excited when current is passed through the winding 173 which at one end is connected to a contact terminal 174 cooperating with the movable blade 159 and at the other end is connected to contact terminal 176 which cooperates with the movable blade 158. When the movable blade 158 is in a resting position, i.e., is inactivated by the core 156, it effects a circuit between the battery 177 and the ignition coil 178 across the contact terminal 179. The ignition switch, not shown, is assumed to be in "on" position. Spaced slightly from terminal 179 is another contact terminal 181 with which movable blade 158 makes contact when it is attracted by the core 156, thus breaking the ignition circuit. However, terminal 181 is connected through wire 182 to terminal 138 of the coil 137 associated with the valve $R^4$ previously described. A resistance 183, which is grounded at 184, is shown connected to terminal 181 and thus is parallel to the control circuit for the valve $R^4$. This has been found to have a stabilizing effect thereon, although it is not a necessary element.

Windings 161 and 169 of the regulator element of the control device are adjusted as to number of turns and wire diameter so as to insure adequate compensation for variations in voltage and amperage while at the same time insuring that the blade 159 will be drawn into contact with terminal 164 when the generator is operated at a speed corresponding to a given engine speed, which will be somewhat higher than idling and generally in the order of 800 to 1500 r.p.m., and will maintain such contact so long as the engine speed is at or above said given or predetermined engine speed. Thus, when the engine is operating below a given speed—1,200 r.p.m. for example—the circuit of the relay comprising the core 156 is open at 159, 164, since the core 157 is not sufficiently excited at this speed, and the ignition circuit remains normally closed through 177, 158, 179, 178. While the ignition circuit is thus closed, the circuit to the electromagnetic pilot 129 is open. When the engine is actively driven by fuel above the given speed—1,200 r.p.m. for example—it is of course necessary that the accelerator pedal 168 be at least partly depressed. When this occurs the circuit of the winding for the core 156 of the relay is closed at 159, 164 but the circuit through winding 163 is open at 165, 166 so that the normal ignition circuit remains intact. However, if the engine is driven by the car or its own inertia at a speed above the given speed of 1,200 r.p.m., for example, generator 171 is effective to energize coils 161 and 169 and if the accelerator pedal is in a resting position, the circuit including both the windings 173 and 163 is closed at 159, 164 and 165, 166. Thereupon, the core 156 attracts the movable blade 158, moving it away from the contact 179 and breaking the ignition circuit, but in the same movement the blade 158 through engagement with the contact 181 closes the control circuit, through lead 182 and coil 137, for the valve R⁴ causing it to act in the manner hereinbefore described when current is available. Even though the engine is being driven by the vehicle, when the engine has slowed down to below the given speed, the energization of coils 161, 169 is reduced and the circuit at 159, 164 will be broken whereupon the normal ignition circuit automatically closes and the circuit of the electromagnetic pilot 129 is broken.

In installing such a device on a Renault automobile model 4 CV, which is equipped with a six-volt generator, winding 161 was made of 1500 turns of 0.015 mm. wire and winding 169 was made of 10 turns of 2.5 mm. wire. The winding 163 was made from 15 turns of 0.40 mm. wire and the winding 173 of the relay was made of 1100 turns of 0.30 mm. wire. Winding 161 is responsive to the voltage of the load current and winding 169 to the amperage thereof. The combining of these two factors gives a steady operation of the regulator, non-responsive to the variations in the battery load, of the current used, or of the temperature. With the apparatus here described on the model 4 CV Renault engine, which engine has a 49 cubic inch cylinder and develops 21 horsepower at a bench test, it was found that the closing and the opening of the contact between blade 159 and terminal 164 took place, for a given adjustment, at 1,250 r.p.m., with maximum variations of ±50 revolutions. Of course, the particular speed may be adjusted, but should always be above the idling speed of the engine so that the ignition circuit will be closed and the normal vacuum within the intake manifold will be resumed prior to the engine's speed falling to the idling speed.

Switch 166 has been shown diagrammatically in Fig. 8. Any conventional switch may be used, which is controlled by lowering the plunger connection 186 of the accelerator pedal, preferably by realizing said control in such a way that movement of the accelerator pedal from its resing position actuates the switch to open position prior to acting upon the throttle. Such a precaution has already been mentioned in the previous description, for instance, by means of the driving clearance of the throttle control 84 in Fig. 3 and in Fig. 6. It avoids the very accurate and delicate adjustment that would be required if such a clearance did not exist, to obtain simultaneously control of the switch and opening of the throttle.

It is well known that the actual connection between a carburetor and a throttle differs in various automobiles but that there are two common types using bell cranks, one in which the bell crank moves toward a pivot point spaced from the carburetor butterfly, and the other in which the bell crank moves from the pivot point.

Figs. 11 and 12 show an accelerator actuated switch which I have developed for use in my control system. This switch has the advantage that it may be associated with either of the two commonly used types of carburetor throttle valve controls. As shown, the switch mechanism is supported on one end of the throttle valve shaft 190 and includes a member 191 freely fitted on the bearing surface 192 provided by the nut 193 which is secured to the end of the shaft 190 and locks a second plate member 194 against a shoulder 195 near the end of the shaft 190. The member 191, preferably stamped out of sheet metal, includes a radially extending arm 196 pivotally connected near its end to a control rod 197 which in turn is connected through appropriate intermediate connections, not shown, with the accelerator pedal. The member 191 is provided with a second arm 198 extending in angular relation to arm 196 and having adjacent the outer end thereof a stamped out portion forming a centering seat 199 for one end of a coil spring 200. The arm 198 also has riveted thereto a stud 201 providing pivotal support for a member 202 which at its free end is provided with a right angle flange 203 supporting an electrical contact 204 formed of a suitable metal such as tungsten or silver. The member 202 is cut out to provide shoulders 205, 205′ limiting its movements and to provide a restricted clearance 206 for a purpose more particularly hereinafter described. The arm 196 is attached adjacent its free end to a spring 207 secured at its opposite end to a suitable support, not shown, which acts to return the arm and the throttle valve to the throttle idling position when the accelerator pedal resumes its inactive or resting position.

The second plate member 194 is flanged laterally at 208 to provide a screw threaded opening for securing the idling adjusting screw 209 in bearing relation to an abutment 210 integral with the carburetor 211. A spring 212 surrounding the adjusting screw 209 and bearing at its opposite ends against the flange 208 and the head of the adjusting screw serves to restrain the screw against movement from a predetermined adjustment position.

The member 194 carries a second portion 213 flanged at a right angle to the general plane thereof. This flanged portion is notched at 214 to receive one end of the pivoted member 202. The flanged portion 213 is also locally stamped out to form a small shoulder 215 for centering and seating one end of the compression spring 200.

A small open ended box of insulating material 216 is secured to the member 194 by a rivet 217 with the open end thereof abutting against the flange 214 and receiving the pivoted member 202 and the contact 204 carried thereby. The box 216 is provided with an opening 218 in the lower side thereof adjacent its closed end, and the end wall is extended downwardly to provide a bracket 219 for supporting a flexible spring blade 220 which carries electrical contact 221. The blade 220 is secured to the bracket 219 by rivet 222. This rivet also secures a terminal 223 against the outer face of the bracket 219. The box 216 is provided with an inwardly extending wall portion serving as an abutment 224 limiting the movement of the blade 220 in the direction toward the contact 204. The thickness of the bracket 219 is such as to insure that the upper end of the spring blade 220 will bear against the abutment 224 when the contacts are out of engagement. The clearance 225 between the contacts 204, 221 is smaller than the clearance 206, thereby insuring a positive sliding of the contacts one over the other before the shoulder 205 is brought into engagement with the adjacent surface of the flange 213 during the closing of the switch. This arrangement insures cleaning of the contacts by friction and thus is a guarantee of their reliability.

Springs 200 and 207 are so adjusted as to their relative strengths and dispositions in the assembly, taking into consideration the resistance to motion of the assembly parts, that spring 207 plays the dominating role when the accelerator pedal is not being actuated and maintains the contacts in engagement during all periods except when the accelerator pedal is depressed. The positions of the elements of the assembly as shown in Fig. 11 are those assumed when the accelerator pedal has been initially actuated from a resting position to the point where the full clearance 206 has been established and the circuit across the contacts 204, 221 has been broken but as yet no movement of the throttle valve 10 from its idling position has occurred. When the accelerator pedal is allowed to assume its resting position following any actuation thereof, the spring 207 takes over causing the member 191 to turn on the nut 193, and transmits, through the abutting action of the shoulder 205 on the flange 213, its action to the throttle axle 190, thereby moving the throttle valve 10 in a closing direction to the extent permitted by the adjusting screw 209 which is brought into contact with the abutment 210 when the predetermined idling position of the throttle valve has been reached. When the turning movement produced by the spring 207 has brought the contact 204 into engagement with the contact 221 the electrical circuit is closed from the battery or other power source, not shown but connected to the terminal 223, to and across the contacts 204, 221 and through the members 202 and 198 to the carburetor and thence to ground.

It will be understood that during the initial stage of depression of the accelerator pedal in which the member 198 is being rotated sufficiently to establish the clearance 206, the throttle valve 110 remains in the idling position because the idling screw is maintained in abutting position against the abutment 210 through the action of the spring 200 on the member 194. It is only when the clearance 206 has been completely reestablished, and upon continued lowering of the accelerator pedal that the member 202, acting through engagement of the shoulder 205' of its notched portion with the flange 213 of the part 194, turns the axle 190 and the throttle valve 10 toward open position.

It will be seen from the foregoing that the described switch device does not require extremely precise adjustment for insuring in a positive manner the separation of the electric contacts and the opening of the circuit established thereby immediately before the opening of the throttle. The magnitude of the clearance is sufficient to determine by construction, once and for all, this positive unchangeable order of the operations. It is the same inversely when the accelerator pedal is released; that is to say, the throttle 10 first assumes its idling position and the electric circuit across the contacts 204, 221 is established only after this idling position is insured.

The above described switch construction has the advantage that it is simple since it only requires small parts of low cost in addition to the standard equipment for control of the carburetor throttle. However, it will be understood that the switch arrangement may take various other forms provided it is arranged in the throttle control circuit so that the closing and opening of the electric circuit occurs either at the precise moment that the accelerator pedal begins to actuate the throttle or during a small interval of travel of the pedal before its action is felt by the throttle in the opening movement of the throttle.

Fig. 13 shows a further embodiment of the vacuum system of the present invention which is generally similar to that shown in Fig. 8 except that the control of the vacuum in the intake manifold is obtained by use of a valve controlled connection which may be opened directly to the atmosphere and does not involve simultaneous crank case ventilation. The electrical controls are the same as those shown in Fig. 8 and have been omitted from Fig. 13 to avoid duplication. The crank case, engine block, intake manifold, carburetor and air filter are similar to those of Fig. 8 and all have been given the same reference numerals. However, the communication between the crank case and the point upstream of the carburetor has been omitted and instead the outlet from the valve $R^4$ is shown as opening directly into the atmosphere. Therefore, the oil port for the crank case is shown as closed by a conventional cap 201.

During idling or active working of the engine in this modification there will be no effect since the controls will insure the closing of depression valve $R^4$. However, when the engine is being passively driven above the predetermined speed, the controls will operate to open the depression valve $R^4$ directly into the atmosphere so that substantial atmospheric pressure will be admitted into the intake manifold. To insure this, the opening to the atmosphere 89 (Fig. 9) must have a cross-section of the same order as the opening 99 to the intake manifold. An air filter 202 has been shown which will clean the air, and if used, it must be one that will not create an appreciable drop in the atmospheric pressure.

In previous portions of this description, it is said that the depression within the intake manifold during deceleration is reduced to substantially atmospheric pressure by opening a passage with a large cross-section from the intake manifold to the atmosphere. It must be borne in mind that the volume of air sucked by an engine varies according to its speed and that the depression within the intake manifold for an intake of air with given cross-section and shape, increases as the driving speed increases. The following test results were realized on a Renault engine, model "Fregate," having four cylinders of 2 liters capacity and a 8.5 compression ratio. This engine included a carburetor whose throttle-well had a 32 mm. inner diameter, and the valve 85 similar to that of Fig. 9 included an orifice 90 with a 26 mm. diameter, directly connected to the intake manifold. With the valve in open position the diaphragm was raised 5 mm. from its seat 88. Lastly, the cross-section of the air intake orifice 89 to the valve was almost rectangular, but with an area equal to a 26 mm. diameter circle.

The depressions observed within the intake manifold, in inches of mercury below atmosphere are shown in the following table:

| | Vehicle driving engine | | Engine driving vehicle— Throttle wide open |
|---|---|---|---|
| Revolutions per minute | Conventional engine | Engine equipped according to Fig. 8 | |
| 1,100 | 21.5 | 1.5 | 0 |
| 1,500 | 24 | 2.5 | 0 |
| 2,200 | 24.5 | 5 | 0 |
| 2,900 | 24.5 | 6 | 1 |
| 3,600 | 24.5 | 8 | 1.5 |
| 4,300 | 25 | 9 | 2 |
| 4,700 | 25 | 10 | 2.5 |

Thus, it is seen that with a depression valve having a cross-section approximately equal to 66 percent of the cross-section of the carburetor body, but with a more complicated circuit, there is obtained during deceleration, with a device according to the invention and while operating up to three quarters of the engine's maximum speed, a pressure that differs from atmospheric pressure by only approximately 7 inches of mercury and which reaches only about 10 inches for a maximum speed.

In considering the figures of the above mentioned example, one must take into account the fact that the depression indicated for an engine equipped according to Fig. 8 was a depression read within the intake manifold itself and that between the intake manifold and orifice 90 there was a difference reaching 3 inches of mercury for the maximum speed. An improved design of this connection would thus have made it possible to reduce still more the above mentioned depressions. Practically, it may be considered that the lower limit to the cross-section of the opening to the atmospheric pressure is about 25 percent that of the passage across the carburetor, which makes it possible to lower the depression within the intake manifold to less than 10 inches of mercury when operating up to speeds equal to 50 percent of maximum engine speed.

It has been found during numerous tests that the reduction of the vacuum or depression in the intake manifold in the manner described herein during decelerations of the engine, causes a removal of carbon deposits within the combustion chambers. Observations effected upon engines that were opened after having run during 9,900, 15,500 and up to 100,000 miles with a device according to Fig. 8 have revealed that the surfaces of each combustion chamber had about 50 percent of their area completely clean, and that the other 50 percent in each instance was covered with only very thin deposits whose thickness did not exceed 0.3 mm. and whose edges did not adhere to the surface.

Several explanations, acting either together or separately, may be responsible for the lessened extent of carbon deposits:

The back-flow of oil within the combustion chambers normally arising from the high vacuums in the manifold is reduced or eliminated. Because of the relatively high pressures prevailing in the chambers during decelerations with my invention, there may be a suppression of the tendency for combustion residues of oil to act as a binder of carbon deposits so that any such deposits are less firmly adherent to the engine cylinder surfaces and consequently more easily eliminated.

The elimination of bad combustion which normally takes place during decelerations in a conventional engine also suppresses the formation of products that would otherwise play the role of binder.

Deposits may still be produced in the same way as in a conventional engine as long as their thickness is thin enough for their whole mass to be subjected to the wall's thermal condition. This thickness would at most be of the order of 0.3 mm. and when the deposits exceed such a thickness the external layers may be more strongly influenced by the thermic condition of the inside of the chamber. Thus during decelerations at maximum working conditions, the introduction of large amounts of air into the cylinders and its subjection to high pressures therein would produce combustion and elimination of the carbon deposits through a repeated Diesel effect, and such a Diesel effect is indicated by the results obtained.

It will also be understood that the lowering of the depression in the intake manifold and consequently in the individual engine cylinders brings about substantial equalization of the pressures in the combustion chambers and in the crank case with resultant reduction in tendency for oil vapors to be drawn past the piston rings into the engine cylinders.

It will be understood, of course, that this aspect of the invention is not to be deemed as limited by any particular theory expressed herein as to why the carbon deposits are eliminated or other noted advantages are realized.

Although the invention has been described in the preceding examples by reference to its incorporation in an internal combustion engine of the carburetor fuel-air mixing type, it will be understood that in its broader aspects it is applicable to engines of the diesel type as well as other engines employing direct injection of fuel into the combustion chambers.

This is a continuation-in-part of my application Serial No. 399,497, filed December 21, 1953, now abandoned.

I claim:

1. In an internal combustion engine connected to furnish the motive power for a self-propelled vehicle or to brake the movement of said vehicle as desired, an air intake for supplying air to the ignition chambers, a direct conduit connection between said air intake and the engine crank case, a second conduit connection between said crank case and the intake manifold of said engine, valve means in said second connection, said valve means being normally biased to closed position and being movable to open position only when said engine is exerting a braking action on the movement of said vehicle.

2. An internal combustion engine as claimed in claim 1, in which the air intake includes means imposing a slight pressure loss on air passing therethrough at low suction with little increase in pressure loss with increased air flow, and in which said direct conduit connection with said air intake is made on the downstream side of said means.

3. An internal combustion engine as claimed in claim 1, in which a condenser for oil vapors is introduced in the direct conduit connection between the crank case and the air intake through which air is supplied to the ignition chambers.

4. An internal combustion engine as claimed in claim 1, wherein the valve means is provided with control means interconnected with control means for the engine ignition circuit so that said ignition circuit is broken simultaneously with the opening movement of said valve.

5. An internal combustion engine as claimed in claim 1, in which said crank case is provided with an auxiliary air intake whereby suction induced through said direct conduit connection causes a sweeping of the crank case by air drawn in through said auxiliary air intake.

6. An internal combustion engine as claimed in claim 5, in which the main air intake includes means imposing a slight pressure loss on air passing therethrough at low suction with little increase of pressure loss with increased air flow therethrough, and in which the auxiliary air intake to the crank case includes means imposing a pressure loss for low flows that is smaller than that imposed by the means included with the main air intake but which imposes a pressure loss of rapidly increasing magnitude with increase of air flow therethrough and wherein the pressure loss always exceeds the pressure loss at the main air intake for all working conditions of the engine other than idling and similar low load conditions.

7. In an internal combustion engine connected to furnish the motive power for a self-propelled vehicle or to brake the movement of said vehicle as desired, a carburetor, an air intake therefor, a direct conduit connection between said air intake and the engine crank case, means interposed in said conduit connection for condensing oil vapors passing therethrough from the crank case to said air inlet, a second conduit connection between said crank case and the intake manifold of said engine, valve means in said second connection, said valve means being normally biased to closed position and being movable to open position only when said engine is exerting a braking action on the movement of said vehicle.

8. In an internal combustion engine, means for controlling the withdrawal and disposal of noxious gases from the crank case comprising conduit connections connecting the crank case with the air intake of the engine carburetor and with the intake manifold, and valve means in the conduit connection to the intake manifold, said valve being movable from closed to open position in response to a predetermined change in the pressure in the intake manifold relative to the pressure in the air intake.

9. In an internal combustion engine, means for preventing discharge of noxious gases from the crank case into the atmosphere surrounding the engine, including conduit connections connecting the crank case with the air intake of the engine carburetor and with the intake manifold, valve means in the conduit connection to the intake manifold, an inlet conduit connected to said intake manifold, a throttle in said inlet conduit, control means for said throttle, and means operated by said control means and connected to said valve means for actuating said valve means to the open and closed positions concomitantly respectively with closing and opening movement of said throttle.

10. In an internal combustion engine, means for preventing discharge of noxious gases from the crank case into the atmosphere surrounding the engine, including a conduit connecting the crank case with the intake to the engine carburetor, an air filter, a second conduit connecting said air filter to said crank case at a point remotely spaced from the connection of said first conduit to said crank case, whereby suction applied through said carburetor induces flow of air through said filter and said crank case, a third conduit connection between said first conduit and the engine intake manifold, valve means in said third conduit connection, and control means therefor, said control means being responsive to conditioning of said engine for braking of said vehicle to move the valve to open position.

11. In an internal combustion engine connected to furnish the motive power for a self-propelled vehicle or to brake the movement of said vehicle as desired, a conduit for conveying to said engine a fluid for generating power therein, means in said conduit operable to control the flow of fluid to said engine for generating power therein, means connected to said conduit and operable to control the pressure of said fluid in said conduit at a given side of said fluid flow control means with respect to the direction of flow through said conduit, means responsive to the speed of said engine and operatively connected to said fluid pressure control means for changing said pressure in said conduit at said given side of said fluid control means in response to a predetermined change in the speed of the engine, and means operable at will and connected to said fluid flow control means for varying at will the fluid flow to said engine to vary the generation of power therein, said means operable at will being connected to said fluid pressure control means to change the pressure of said fluid in said conduit at a given side of said fluid flow control means in a predetermined relation to operation of said means operable at will so as to control the flow of said fluid to said engine.

12. In an internal combustion engine connected to furnish the motive power for a self-propelled vehicle, a system for controlling the supply of fuel to the combustion chambers including a throttle valve responsive to movements of the accelerator to and away from its resting position, switch means responsive to movement of said accelerator away from resting position to close the ignition circuit of said engine and acting to interrupt said ignition circuit upon return of said accelerator to resting position, and means establishing a loose connection between said valve and said accelerator such that movement of said accelerator away from resting position causes closing of the ignition circuit in advance of movement of said valve in its opening direction.

13. In an internal combustion engine connected to furnish the motive power for a self-propelled vehicle and which engine is associated with an automatic speed change transmission and a speed regulator and a circuit connected to said transmission and said regulator, a system for controlling the supply of fuel to the combustion chambers including an electrically actuated valve whereof the actuating circuit is connected in parallel with the ignition circuit, switch means connected for concomitant inactivation of said ignition circuit and activation of said valve actuating circuit, a solenoid relay for actuating said switch means to activate said ignition circuit and to inactivate said valve actuating circuit, means for actuating said relay comprising two control circuits therefor, the first being closed in response to movements of the accelerator pedal away from its resting position and the second being closed in response to energization of the speed regulator-transmission circuit.

14. A fuel supply control system as claimed in claim 13 wherein the second control circuit for said solenoid relay is closed in response to actuation of a relay disposed in the speed regulator-transmission circuit.

15. In an internal combustion engine connected to furnish motive power for a self-propelled vehicle or to brake the movement of said vehicle as desired, an intake conduit for supplying fuel and air to the combustion chambers, an accelerator pedal, a throttle valve for controlling the normal feeding of a fuel mixture through said conduit in response to movements of said accelerator pedal, a solenoid actuated valve connected to said intake conduit and operable for limiting the flow of fuel through said conduit during intervals when the engine is acting as a brake and being driven by the vehicle, a circuit for said solenoid of said valve, a switch in said circuit under the control of a second solenoid acting when energized to move said switch to circuit opening position, and means responsive to movement of the accelerator pedal in the throttle opening direction and connected to said second solenoid to energize said second solenoid, said second solenoid being connected to a speed regulator and being responsive to current flow therethrough established by said speed regulator.

16. In an internal combustion engine connected to furnish the motive power for a self-propelled vehicle and which engine is associated with an automatic speed change transmission and a speed regulator therefor, a system for controlling the supply of fuel to the combustion chambers including an electrically actuated valve whereof the actuating circuit is controlled at a given position of a two-position switch and the ignition circuit is controlled at the other position of said switch, a solenoid relay for actuating said switch at said given position to open said valve and to inactivate said ignition circuit, said relay also being connected in series with two parallel control circuits therefor, either of which when closed causing activation of the ignition circuit, the first being closed in response to movements of the acceleration pedal away from its resting position and the second being closed in response to energization of the speed regulator-transmission circuit.

17. In an internal combustion engine connected to furnish the motive power for a self-propelled vehicle and which engine is associated with a speed responsive load regulator, a system for controlling the supply of fuel to the combustion chambers including an electrically actuated valve connected in an actuating circuit, an ignition circuit, switch means connected in said circuits and operable for concomitant inactivation of said ignition circuit and activation of said valve actuating circuit, a solenoid relay for actuating said switch means for selectively activating said circuits, means for actuating said relay comprising a second solenoid relay and a second switch means controlled thereby, said second solenoid relay being connected to said load regulator and being actuated to close said second switch in response to energization of the load regulator controlled circuit, and means responsive to movement of the accelerator from resting position to open said second switch and inactivate said valve actuating circuit.

18. In an internal combustion engine connected to furnish motive power for a self-propelled vehicle, an intake conduit for supplying fuel and air to the combustion chambers, an accelerator, a throttle valve controlling the flow of a fuel mixture through said conduit, said throttle valve being responsive to movements of the accelerator, a switch having one contact thereof supported on the throttle valve shaft and movable therewith and a second contact supported in cooperative relation with said first contact on a member establishing a loose connection between said throttle valve and said accelerator, means for normally biasing said loose connection member toward switch closing position, and said member being movable in the initial stages of movement of the accelerator to a position separating said switch contacts in advance of any movement of the throttle valve.

19. In an internal combustion engine connected to furnish motive power for a self-propelled vehicle, an intake conduit for supplying fuel and air to the combustion chambers, a throttle valve controlling the flow of a fuel mixture through said conduit, an accelerator and means establishing a loose connection between the accelerator and said throttle valve whereby said throttle valve is actuated with a predetermined delayed action in response to movement of the accelerator from its resting position, an ignition circuit for said engine, and means responsive to the initial movement of said accelerator from its resting position to activate said ignition circuit.

20. In an internal combustion engine connected to furnish the motive power for a self-propelled vehicle, a system for controlling the operation of said engine comprising an accelerator, a supply conduit connected to said engine for conveying the fuel mixture to said engine, a valve in said conduit operatively connected to said accelerator so as to be responsive to movement of said accelerator away from and toward the resting position of said accelerator for operating said valve to control said supply of fuel mixture to said engine, ignition means for said engine, and switch means connected to said ignition means and operable to control the ignition of said engine and operatively connected to said accelerator so as to be responsive to movement of said accelerator to a position away from said resting position to effect a given operation of said switch means to establish ignition of said engine, said operative connections between said accelerator and said valve and said switch means including means for effecting said given operation of said switch means in advance of operation of said valve in said movement of said accelerator to said position away from said resting position.

21. In an internal combustion engine, a system for controlling the operation of said engine comprising a supply conduit connected to said engine for conveying the fuel mixture to said engine, a valve in said conduit operable to control the supply of fuel mixture to said engine, electrically actuated means operatively connected to said engine and operable to determine a pressure condition of the fuel mixture at a predetermined point in the path of said fuel mixture as it is conveyed to said engine through said conduit and burned in a combustion chamber of said engine, switch means connected to said electrically actuated means and operable to effect actuation of said electrically actuated means to determine said pressure condition, and means operatively connecting said switch means to said valve with a lost motion therebetween to actuate said electrically actuated means in a differential time relation to the operation of said valve controlling the supply of fuel mixture to said engine.

References Cited in the file of this patent

UNITED STATES PATENTS

| | | |
|---|---|---|
| 1,138,628 | Cook | May 11, 1915 |
| 1,215,381 | Kemp | Feb. 13, 1917 |
| 1,890,791 | Messinger et al. | Dec. 13, 1932 |
| 1,970,002 | Ericsson | Aug. 14, 1934 |
| 2,154,593 | Way | Apr. 18, 1939 |
| 2,276,378 | Duguay | Mar. 17, 1942 |
| 2,415,491 | Hieger | Feb. 11, 1947 |
| 2,439,573 | Mallory | Apr. 13, 1948 |
| 2,443,562 | Hieger | June 15, 1948 |
| 2,466,090 | Fageol | Apr. 5, 1949 |
| 2,617,398 | Taber | Nov. 11, 1952 |
| 2,724,375 | Schaffer | Nov. 22, 1955 |
| 2,730,090 | Holl | Jan. 10, 1956 |
| 2,733,696 | Schneider | Feb. 7, 1956 |
| 2,744,510 | Tyler et al. | May 8, 1956 |
| 2,755,786 | Doering | July 24, 1956 |

FOREIGN PATENTS

| | | |
|---|---|---|
| 826,085 | Germany | Dec. 27, 1951 |